March 31, 1970   A. R. BURCH ET AL   3,503,476
OSCILLATION DAMPER FOR A STACKER VEHICLE
Filed June 7, 1968   2 Sheets-Sheet 1

INVENTORS
ARTHUR R. BURCH
JAMES H. SNYDER
BY
R. J. Falbowski
ATTORNEY

United States Patent Office

3,503,476
Patented Mar. 31, 1970

3,503,476
OSCILLATION DAMPER FOR A STACKER VEHICLE
Arthur R. Burch and James H. Snyder, Battle Creek, Mich., assignors to Clark Equipment Company, a corporation of Michigan
Filed June 7, 1968, Ser. No. 735,382
Int. Cl. B60l 7/22
U.S. Cl. 188—159                    13 Claims

ABSTRACT OF THE DISCLOSURE

A stacker vehicle operates to transfer material longitudinally along an aisle by movement along a set of rails, vertically by movement of an elevator within the superstructure of the vehicle, and laterally by the operation of a laterally movable platform portion of the elevator. A damping mechanism mounted at the top of the vehicle has two rollers biased against a guide rail. One of the rollers is connected to drive a selectively energized electrical generator that absorbs the energy of oscillation and thereby damps out the oscillation of the superstructure resulting from stopping of the vehicle.

---

This invention relates to oscillation damping devices, particularly to damping devices for vehicles having a vertical superstructure with an unsupported end that oscillates when the vehicle is stopped.

When operating vehicles having a high superstructure either extending upwardly in a ground supported vehicle or downwardly in an overhead supported vehicle such as stacker vehicles in material-handling and storage systems, one of the inherent problems is the longitudinal oscillation or sway developed in the superstructure when the vehicle is significantly slowed down and particularly when it is stopped. The oscillation introduces a time delay in the load and unloading operations because proper alignment of the elevator with the selected bin opening, particularly when operating near the unattached end of the superstructure, cannot be accomplished until the oscillation has stopped. Excessive oscillation also creates undesirable stresses in the structure metal and fittings.

With this invention, a means for damping such oscillation engages the vehicle superstructure with a stationary guide rail through a roller movement transferring mechanism that drives an electrical generator. Upon operation of the system to stop the vehicle, the generator is energized at a selected level to damp out the oscillations. The damping rate is controlled by selecting the load across the output windings of the generator and the level of energization of the excitation winding of the generator.

The objects and advantages of this invention will be apparent from the following detailed description.

Figure 1:
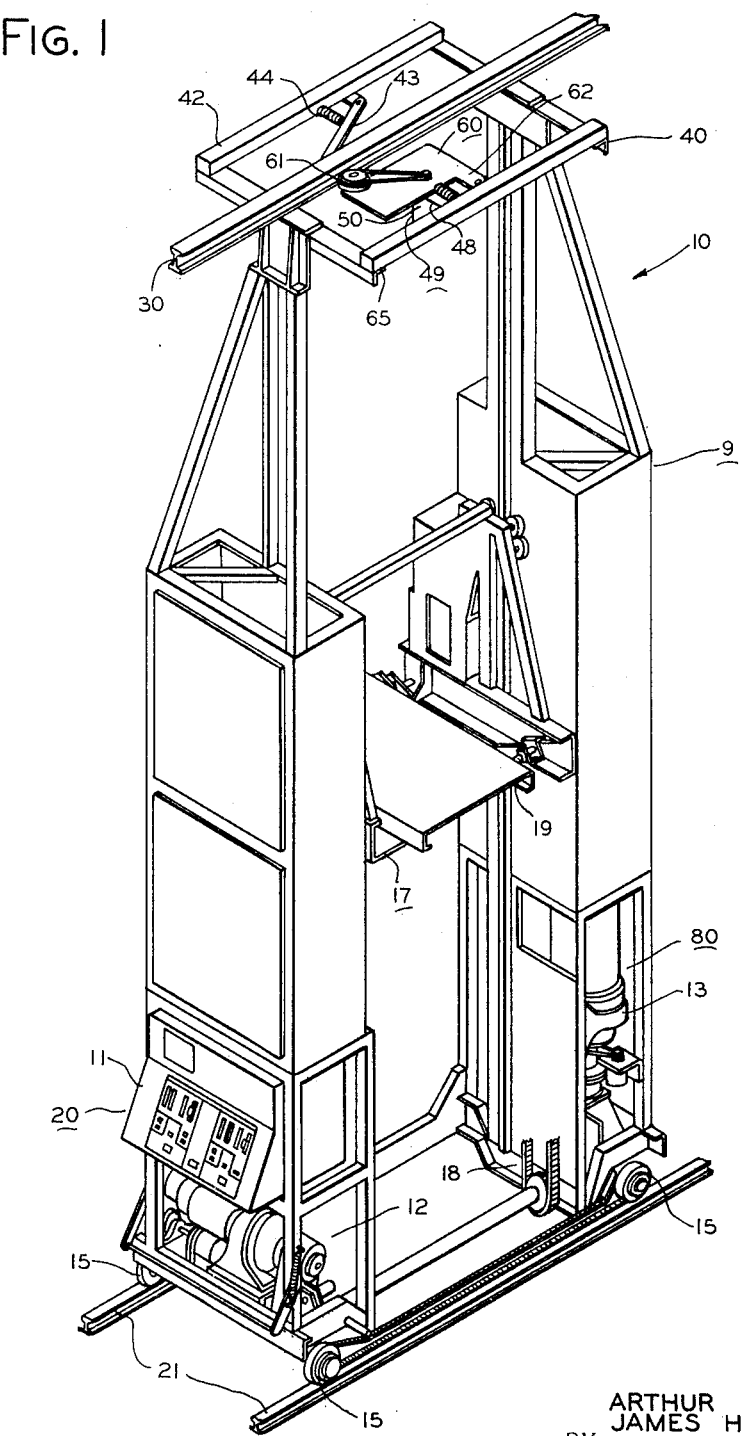
FIGURE 1 is a perspective drawing of a stacker vehicle having means for damping oscillations of its superstructure according to this invention.

Referring to FIG. 1, a stacker vehicle 10 having a relatively high superstructure 9 comprises a system control means 20 of any known type that includes a control center 11 and a vehicle driving means 80 including appropriate motor drives 12 and 13 for controlling the longitudinal movement of the vehicle through wheels 15, for controlling the vertical movement of an elevator 17 through appropriate connecting mechanisms (not fully shown) of any known type such as a drive chain assembly 18, and for controlling the lateral movement of a material handling platform 19 through appropriate connecting mechanisms (not fully shown) of any known type to pick up and deposit material units into a bin or similar structure (not shown). The vehicle is longitudinally driven along rails 21 and is controlled to travel at various speeds, depending upon the distance it is to be moved, including a low, positioning speed used to accurately position the vehicle longitudinally relative to a selected bin. In typical operation, the vehicle is operated at a high speed for moving between bins, at an intermediate speed on approach to a selected position, such as a bin, and at the low speed for accurate positioning of the vehicle when it is to be stopped at a selected position.

A typical installation that would use this invention is described in patent application for "Automatic Warehousing Method and Means," Ser. No. 543,224, filed Apr. 18, 1966.

The means for damping the oscillations of the superstructure comprises a guide means, including a guide rail 30, for providing a longitudinally stationary reference adadjacent the path of the vehicle; a conversion means, including a top damping assembly 40, for producing a resultant movement derived from, and varying as a function of, the rate of movement of the superstructure relative to the guide means; a restraining means such as an electrical means 49, including an alternating current electrical generator 50, having a selectable electromagnetic resistance to movement to control the conversion means for restraining the movement of the superstructure relative to the guide means at a damping rate determined by the electromagnetic resistance selected; and a damping control means 90, including a controlled switch 91, for selectively controlling the electromagnetic resistance in response to the occurrence of a selected change in the speed of longitudinal movement, as when the vehicle is shifted to the low positioning speed.

The guide means includes guide rail 30 and appropriate structure (not shown) that supports the guide rail at a selected position relative to rails or tracks 21 and the bin structure of the system.

Figure 2:
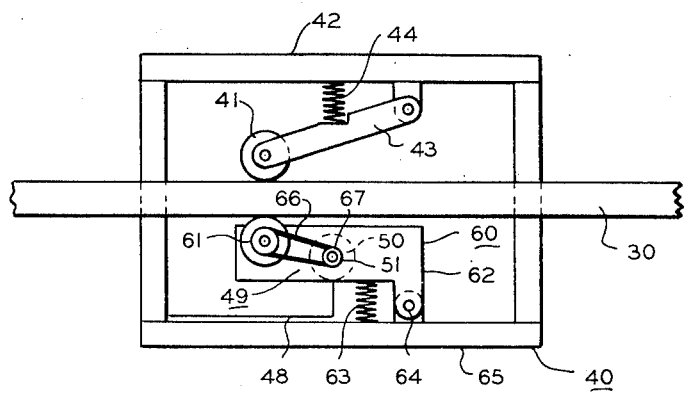
FIGURE 2 is a simplified detail drawing of a damping housing structure that engages the guide rail at the top of the stacking vehicle.

The conversion means includes top support assembly 40 that is operably connected to guide rail 30 and connected to the superstructure at the unattached end, in this embodiment at the top. As shown in FIGS. 1 and 2, support assembly 40 comprises a bearing wheel or roller 41 biased inwardly from a frame member 42 toward a guide rail 30 by a spring 44 and a lever arm 43. Roller 41 is biased against the guide rail to maintain a determinable force relative to a damping assembly 60 that comprises a roller 61 mounted on a lever arm 62 rotatable about a pivot 64 and biased inwardly toward guide rail 30 by a spring 63 mounted between arm 62 and a member 65. The biasing of arm 62 towards the guide rail engages roller 61 with the guide rail and roller 61 is connected through a reducing pulley 66 to a wheel 67 to provide the resultant movement.

Electrical means 49 is connected to the conversion means by rotor shaft 51 of generator 50 to wheel 67. Generator 50 is electrically energized along a conductor 48 from an electrical source and mounted on arm 62 in any known manner. The reducing pulley is selected to provide a speed of rotation of the rotor of generator 50 that is increased sufficiently to produce the required rate of rotation for desired operation of the generator.

Figure 3:
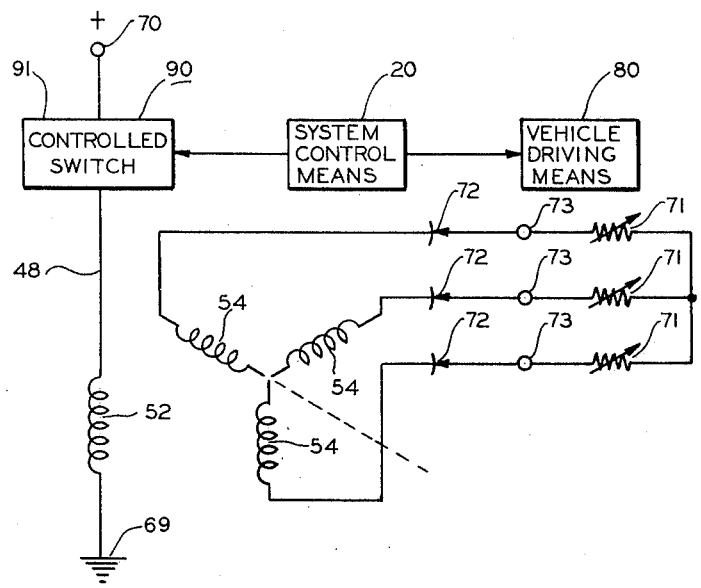
FIGURE 3 is a simplified block and schematic drawing of the damping means control system and its associated electrical control circuitry.

The electromagnetic resistance to rotation of the rotor of generator 50, as shown primarily in simplified form in FIG. 3, is controlled by selecting the level of the electrical source, such as a direct current power source 70 connected to energize the generator field or excitation winding 52 through a ground 69, and by selecting or adjusting load resistances 71 that are connected across the output windings 54 of generator 50 through slip rings 72 and connectors 73.

An alternating current generator is suitable for this embodiment because it provides a direct relationship between the field or excitation current and the damping coefficient, and because switches, amplifiers and other devices may be used to vary the output resistance, and thereby the damping coefficient, as desired. In addition, the torque generated at the output shaft is proportional to the instantaneous velocity and decreases to zero as the velocity decreases to zero. There is no residual offset displacement as occurs when usual frictional forces are used to dissipate oscillating motion. Thus, induced oscillations are rapidly damped without compromising positioning accuracy in the system.

A three phase automotive type alternator is an example of a suitable type of an alternating current generator, although other types such as a squirrel cage motor may be used, because relatively large torques are derived from a small physical package, and a very steep slope is obtained in the relationship of shaft torque to shaft speed, thereby making large damping factors possible. Such a generator also gives a very definite and controllable absolute limit to the value of torque generation, and uses slip rings rather than brushes so that no current interruptions occur in operation. This contributes to long life, permits large output currents, therefore, high torque and provides a simple control structure. Also, it is possible to utilize a permanent magnet rotor and even eliminate the need for slip rings.

Referring to FIG. 3, a system control means 20 is generally of any known type that controls vehicle driving means 80 of any known type to accomplish the desired operation. The control means when changing the speed of the vehicle to a low positioning speed, as when the vehicle is close to its destination, also produces a control signal to controlled switch 91 that operates to connect direct current electrical source 70 to excitation winding 52 of the generator. Thus, the generator is energized only upon switching of the stacking vehicle to a selected speed such as the fine positioning, low speed, or when the vehicle is stopped for any reason. An unenergized generator does not produce any significant forces opposing the rotation of its rotor, and, therefore, creates no restraining effect on movement of the stacking vehicle during normal higher speed operations when winding 52 is not energized.

While this specification contains a written description of the invention and the manner and process of making and using it and sets forth the best mode contemplated of carrying out the invention, there are many variations, combinations, alterations and modifications of the invention that can be made within the spirit of the invention and the scope of the appended claims.

We claim:

1. Means for damping the longitudinal oscillation of the superstructure of a vehicle of the type longitudinally movable along a selected path at a controlled speed, said means comprising:

a guide means for providing a longitudinally stationary reference adjacent the path of the vehicle;

a conversion means operably connected to the superstructure and to the guide means for producing a resultant movement varying as a function of the rate of movement of said superstructure relative to said guide means;

a restraining means having a selectable resistance to movement connected to the conversion means to receive the resultant movement and to control the conversion means for restraining the movement of the superstructure relative to the guide means at a damping rate determined by the resistance selected; and a control means for selectively controlling the resistance in response to the occurrence of a selected change in the speed of longitudinal movement of the vehicle.

2. Means for damping according to claim 1 wherein said restraining means comprises an electrical device having a selectable electromagnetic resistance.

3. Means for damping according to claim 2 wherein said control means connects the electromagnetic resistance to the electrical device when the vehicle is stopped.

4. Means for damping according to claim 2 wherein said guide means comprises a guide rail running parallel to the path of the vehicle.

5. Means for damping according to claim 3 wherein said conversion means comprises a roller connected to the superstructure of the vehicle and located to engage the guide rail.

6. Means for damping according to claim 2 wherein said electrical device is an electrical generator having an excitation winding and a rotor with output windings connectable to a selected load resistance with said rotor connected to the conversion means to receive the resultant movement, and wherein said control means comprises an electrical excitation source having a preselected level connected to the excitation winding of the generator upon occurrence of the selected speed of longitudinal movement.

7. Means for damping according to claim 2 wherein said electrical device is an electrical generator having a rotor with an output winding and an excitation winding energized by a direct current source of a preselected level, and wherein said control means comprises a variable output rsistance connected to the output winding selectively upon the occurrence of the selected change in speed of longitudinal movement.

8. Means for damping according to claim 7 wherein said guide means comprises a guide rail running parallel to the path of the vehicle.

9. Means for damping according to claim 8 wherein said conversion means comprises a roller connected to the superstructure of the vehicle and located to frictionally engage the guide rail.

10. Means for damping the longitudinal oscillation of the superstructure of a vehicle of the type longitudinally movable along a selected path at a controlled speed, said means comprising:

a guide rail running parallel to the longitudinal path adjacent the vehicle, a roller connected to the superstructure of the vehicle in a location to oscillate with the superstructure and to roll against the guide rail, an electrical generator having a controllable electromagnetic resistance to rotation, means for rotatably connecting the generator and the roller, and means for selectively controlling the electromagnetic resistance of the generator in response to a selected change in the speed of longitudinal movement.

11. Means for damping according to claim 10 wherein said electrical means comprises an electrical generator having an excitation winding and a rotor with output windings connected to a selected load resistance with said rotor connected to the conversion means to receive the resultant movement, and wherein said control means comprises an electrical excitation source having a preselected level connected to the excitation winding of the generator upon occurrence of the selected speed of longitudinal movement.

12. A means for damping according to claim 11 wherein said electrical means comprises an electrical generator having a rotor with an output winding and an excitation winding energized by a direct current source of a preselected level, and wherein said control means comprises a variable output resistance connected to the output winding of the generator selectively upon the occurrence of the selected change in speed of longitudinal movement.

13. Means for damping according to claim 10 wherein said electrical generator has a rotor with shorted output windings and an excitation winding with said rotor connected to the roller, and said means for selectively controlling energizes the excitation winding at a preselected level in response to a change in the speed of longitudinal movement of the vehicle to stop the vehicle.

References Cited

UNITED STATES PATENTS

| 2,788,457 | 4/1957 | Griest | 188—1 X |
| 3,362,504 | 1/1968 | Maldarelli | 188—1 |

DUANE A. REGER, Primary Examiner

U.S. Cl. X.R.

188—1